Dec. 18, 1962  A. PEDALINO  3,068,777
SELF-TIMING AUTOMATIC COFFEE PERCOLATOR
Filed April 24, 1961  2 Sheets-Sheet 2

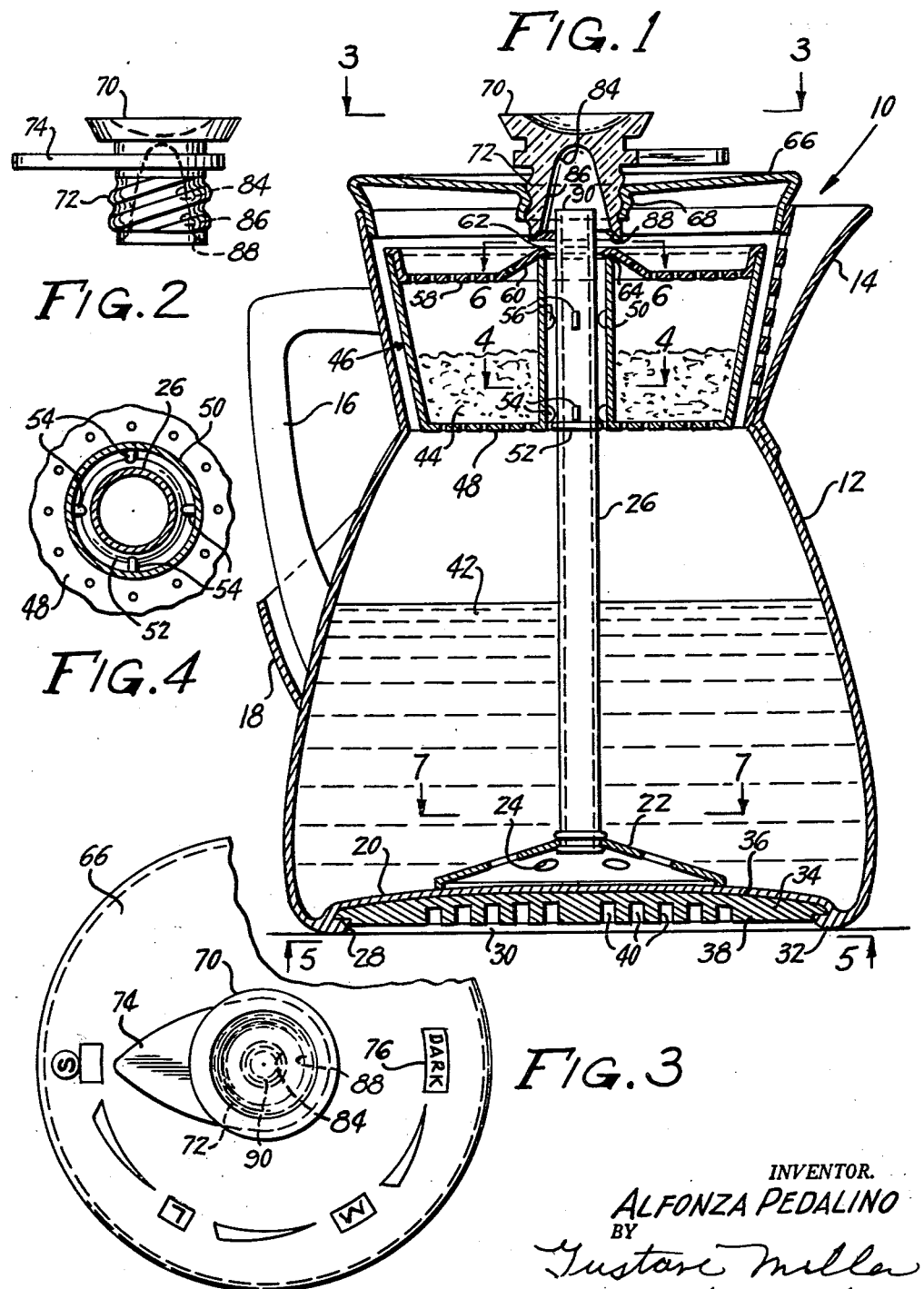

INVENTOR.
ALFONZA PEDALINO
BY
ATTORNEY.

3,068,777
SELF-TIMING AUTOMATIC COFFEE PERCOLATOR
Alfonza Pedalino, 2 Floyd Lane, Commack, N.Y.
Filed Apr. 24, 1961, Ser. No. 104,904
8 Claims. (Cl. 99—305)

This invention relates to a self-timing automatic coffee percolator and has for an object to provide an improved coffee pot percolator wherein the coffee may be set to automatically percolate for an optimum period of approximately seven minutes after an external heat source to the coffee pot has been discontinued, and without danger of the coffee pot boiling over before or during the percolating period.

A further object of this invention is to provide an improved coffee pot percolator having a heat retaining element and a valve element for diverting the percolating water from the coffee brewing basket until the valve is opened, at the time that the heat retaining element is removed from the external heat source, whereby the heat retaining element will cause the water to percolate for an optimum period of approximately seven minutes through the coffee brewing basket.

Still a further object of this invention is to provide a pointer handle on the valve to the coffee brewing basket so as to regulate the amount of percolating water that reaches the basket, and thus regulate the strength of the coffee brewed during the brewing period provided by the heat element.

Still a further object of this invention is to provide a self-timing automatic coffee percolator which may be left for an indefinite period at a time on an external heat source, with a valve in closed position preventing percolating water from reaching the coffee brewing basket therein, and then, when removed from the external heat source and the valve is opened, the heat retaining element will cause the water to percolate through the coffee brewing basket for an optimum period of approximately seven minutes, which is recognized as the optimum period for proper percolation of coffee.

With the above and related objects in view, this invention consists in the details of construction and combination of parts, as will be more fully understood from the following description, when read in conjunction with the accompanying drawing, in which:

FIG. 1 is a vertical view through the self-timing automatic coffee percolator of this invention.

FIG. 2 is an elevational view of the sight glass valve and pointer handle.

FIG. 3 is a top plan view, partly broken away, of the sight glass pointer handle and pot cover.

FIG. 4 is a sectional view on line 4—4 of FIG. 1.

Figure 5:
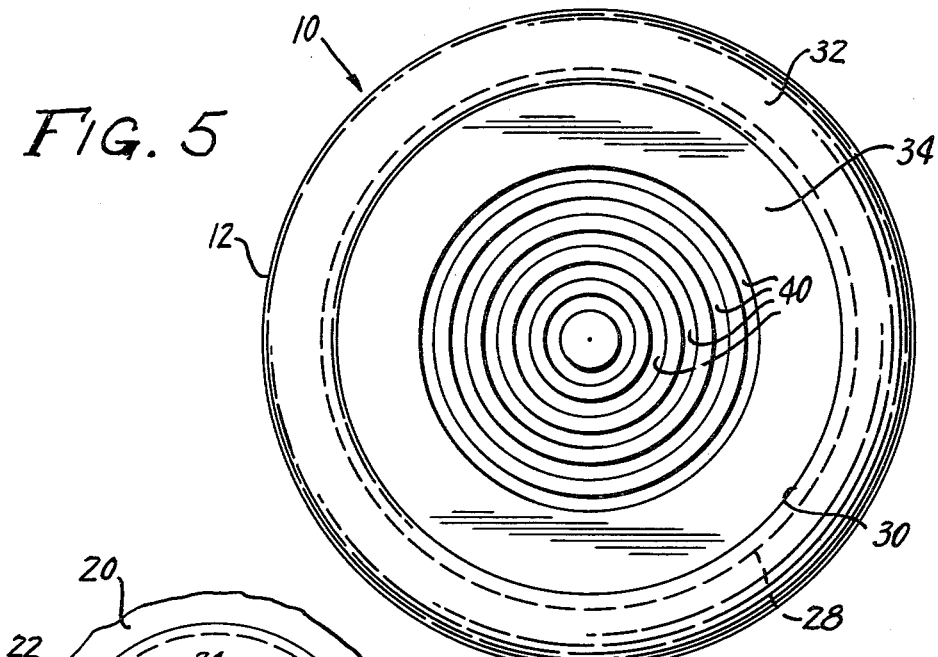
FIG. 5 is a bottom plan view on line 5—5 of FIG. 1.
Figure 7:
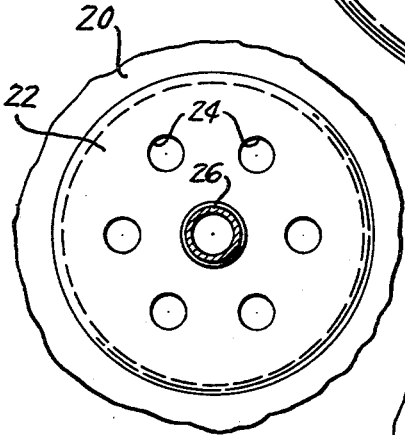
FIG. 7 is a sectional view on line 7—7 of FIG. 1.
Figure 6:
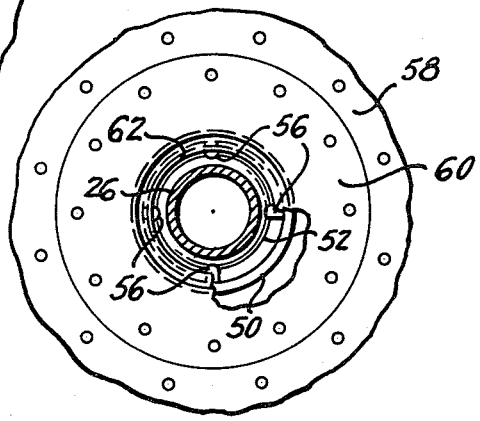
FIG. 6 is a sectional view on a larger scale, partly broken away, on line 6—6 of FIG. 1.

There is shown at 10 the self-timing automatic coffee percolator of this invention. This percolator 10 includes a coffee pot 12 which, while it may be of any convenient size, is here shown as being of approximately a five-cup size. The pot 12 is provided with a customary pouring spout 14, a conventional handle 16, and a flame guard 18 for keeping the handle 16 cool and protected from the flame or external heat source. Supported on the bottom wall 20 of the coffee pot 12 is a flared foot 22 perforated, at usual, at 24 and supporting a hollow percolating stem 26.

Supported by an annular lip 28 within a recess 30 and spaced from the bottom edge 32 of the pot 12 is a heat-retaining disc 34, preferably of cast iron. The cast iron disc 34 may be chromium plated to add corrosion resistant properties thereto. The upper surface 36 of the cast iron disc 34 is in intimate contact with the bottom surface of the bottom wall 20 of the pot 12, but the bottom surface 38 of the disc 34 is provided with a plurality of annular concentric grooves or recesses 40, approximately shaped as shown. In an approximately five-cup size pot 12 shaped substantially as illustrated, the diameter of the cast iron disc 34 is approximately four and one-half inches, the maximum thickness is approximately one-quarter of an inch, and the weight is approximately one-half a pound.

It has been found that a disc of cast iron of this size and weight provides a mass in this size of pot that will retain sufficient heat, after the pot is separated from an external heat source such as a gas flame, an electric range, or a kitchen coal stove or even a camp stove or open fire, to keep the water 42 in the pot percolating for approximately seven minutes. The coffee 44 is placed in a coffee brewing basket 46 having a perforated bottom 48 and an imperforate hollow center shaft 50. The internal diameter of the shaft 50 is substantially greater, contrary to the customary manner, than the external diameter of the percolating stem 26. The percolating stem 26 is provided with its customary basket-supporting stop 52, it being noted in FIG. 4 that there is a circulating passage space between the outside of basket-supporting stop 52 and the inside of basket shaft 50. The basket shaft 50 is provided with a plurality of annularly spaced internally extending dimples 54, the bottom annular row of which extends in sufficiently to be supported on the basket-supporting stop 52 on percolating stem 26, while at least one additional annular row of dimples 56 is provided thereabove so as to maintain the basket 46 in proper balanced position.

Supported on the top of the basket 46 is a perforated basket cover 58, a central annular upwardly flared flange 60 being provided to extend over the top edge of the basket shaft 50. This flange 60 provides a valve seat 62 extending over the top edge 64 of basket shaft 50, this flange 60 and valve seat 62 preventing any water from passing between the flange 60 and the top edge 64 of shaft 50 when the cover 58 is pressed downwardly thereagainst.

The coffee pot 12, itself, is provided with a pot cover 66 having a threaded flange 68 extending centrally therein and cooperating with a sight glass valve 70 having external threads 72 complementary to the threads in flange 68. This transparent sight glass valve 70, in addition, is provided with a pointer handle 74 both for rotating the sight glass valve 70 so as to cause it to extend into or retract out of the threaded flange 68, and to cooperate with indicia 76 which, as illustrated in FIG. 3, extends in a semi-circle from the letter "S," standing for "Start" about the letter "L," standing for "Light," past the letter "M," standing for "Medium" to the word "Dark." Within the transparent sight glass valve 70 there is provided an upwardly extending tapering recess 84, the wall 86 of recess 84 flaring outwardly to an annular valve 88 provided on the bottom of the sight glass valve 70, the annular valve 88 being arranged to cooperate and close off the valve seat 62 and press basket cover flange 60 against shaft top edge 64 when the pointer handle 74 is over the indicia "S," as illustrated in FIG. 3. The pot cover 66 is held in place by a tight friction fit but, if desired, any suitable conventional means, such as complementary threads, may be used to insure retaining the pot cover in place when the valve 88 is pressed against its valve seat 62.

In FIG. 1, the pointer handle 74 has been rotated to the opposite position, retracting the valve 88 the maximum desired position from the valve seat 62. It will be observed, particularly in FIG. 1, that the peripheral edge of the recess wall 86 extends outwardly over the valve seat 62 and leads to the flared flange 60, and it will also be observed that even in this maximum open position, the top edge 90 of percolator stem 26 is located within the recess 84 in the sight glass valve 70.

In operation, the percolator 10 may be set over any suitable heat source such as an electric range, a gas range, an oven, or any other external heat source. First, the coffee 44, of course, is placed in the brewing basket 46 and then the pot cover 66 is placed in position, with a measured amount of water 42 already in the pot, and the valve is closed by turning the pointer handle 74 clockwise as observed from above, to the position shown in FIG. 3, and this, through cooperation of the sight glass valve thread 72 and the threaded flange 68, will bring the valve 88 into cooperating closed position against the valve seat 62 provided on the top edge 64 of shaft 50, simultaneously pressing the flange 60 against top edge 64 of shaft 50, thus insuring that no water can leak into coffee basket 46.

The percolator 10 is then placed over the appropriate heat source and left there for an indefinite period until it is observed either by sound or by sight through the sight glass valve 70, that the water is percolating. As long as the valve 88 is in closed position, the water percolating up through percolator stem 26 hits the recess walls 86 and is conducted downwardly through the circulating passage between the basket shaft 50 and the percolating stem 26, back to the water 42 in the pot. The percolating water cannot reach the coffee 44 in basket 46 so long as the valve is in closed position, and as long as it does not reach the coffee to adulterate the water, it does not boil over onto the source of heat.

Then, when it is observed that the water is percolating, the heat source is discontinued, either by removing the pot 12 from the heat source or, if a gas flame, merely by cutting off the flame. At the same time, the pointer handle 74 is moved from the "S" position as far toward the "Dark" position as desired, and the water will continue to percolate for approximately seven minutes. However, once the valve has been opened, the water percolating up through the stem 26 into recess 84 and hitting the wall 86 thereof will follow along the wall 86, which extends outwardly over the valve seat 62 and flange 60, and thus be led to the flange 60 and down through the perforations in the basket cover 58 and through the coffee 44 and perforated basket bottom 48, and the mass of the disc 34 is such that this will continue for approximately seven minutes, which has been found to be the optimum period which coffee should be percolated to provide the most desirable coffee with all the coffee flavor, and without any of the oils which start to come through when this period of time is exceeded by any substantial amount. Obviously, the amount of water reaching the coffee 44 in the coffee basket 46 depends on the amount the valve 70 is turned and opened. Then, when the percolating stops, the coffee in the pot may then be used by being poured out through the spout 14, or, it may be left in the pot a while longer, if desired, for while it will not percolate any longer, there will still be some residual heat in the disc 34 to keep the coffee warm for a period much longer than is possible in an ordinary coffee pot, without this heat retaining means. Also, when the heat source is discontinued, the heat from the heat disc 34 reaching the water 42 while sufficient to continue the percolation for seven minutes, is insufficient to cause the pot to boil over as happens with conventional percolators.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A self-timing automatic coffee percolator comprising a coffee brewing pot having side and bottom walls, a bottom heat retaining element secured in intimate contact with said bottom wall of said pot, a hollow percolating stem having a flared perforated foot resting on said pot bottom wall, a brewer basket stop formed on said stem, a perforated brewer basket, a perforated basket cover, a hollow imperforate basket center shaft of greater internal diameter than the external diameter of said percolating stem, said basket shaft fitting over said percolating stem, a plurality of spacing dimples extending from said basket hollow shaft cooperating with said stem and said basket stop to support said basket thereon and provide a circulating passage between said stem and said imperforate hollow shaft, an annular valve seat flaring outwardly and downwardly toward said perforate basket cover provided on the top edge of said basket shaft, a pot cover, a sight glass valve threadedly retractable centrally through said pot cover, an annular valve provided on the bottom edge of said sight glass valve about an upwardly extending tapering recess therewithin, said sight glass valve being threadable into and out of cooperation with said valve seat, said percolating stem extending into said sight glass valve recess in normal open or closed positions of said valve, the annular edge of said tapering recess extending outwardly over said valve seat to lead drippings from the wall of said recess over said valve seat to said basket perforate cover when said valve is in open position, said valve, when closed against said valve seat, leading the drippings to said circulating passage between said stem and shaft.

2. The percolator of claim 1, a pointer handle on said sight glass valve above said pot cover, and cooperating indicia on said pot cover.

3. The percolator of claim 1, said heat retaining element comprising a cast iron disc supported at its annular edge in a complementary external recess in said pot bottom wall.

4. The percolator of claim 3, and an internally extending lip in said pot bottom wall extending into said recess and supporting said disc above the bottom edge of said recess.

5. The percolator of claim 3, said disc having a plurality of annular concentric grooves extending inwardly from the bottom surface.

6. The percolator of claim 5, the diameter of said disc being approximately four and one-half inches, the maximum thickness being approximately one quarter of an inch and the weight being approximately one-half pound, the mass of said disc being such that when heated by a heat source sufficiently to cause water in an approximately five-cup size pot to commence percolating, the disc will continue to cause the water to percolate for approximately seven minutes after the heat source is discontinued.

7. A coffee percolator comprising a coffee brewing pot having side and bottom walls, a hollow percolating stem having a flared perforated foot resting on said pot bottom wall, a brewer basket stop formed on said stem, a perforated brewer basket, a perforated basket cover, a hollow imperforate basket center shaft of greater internal diameter than the external diameter of said percolating stem, said basket shaft fitting over said percolating stem, a plurality of spacing dimples extending from said basket hollow shaft cooperating with said stem and said basket stop to support said basket thereon and provide a circulating passage between said stem and said imperforate hollow shaft, an annular valve seat flaring outwardly and downwardly toward said perforate basket cover provided on the top edge of said basket shaft, a pot cover, a valve body threadedly retractable centrally through said pot cover, an annular valve provided on the bottom edge of said valve body about an upwardly extending tapering recess therewithin, said valve body being threadable into and out of cooperation with said valve seat, said percolating stem extending into said valve body recess in normal open or closed positions of said valve, the annular edge of said tapering recess extending outwardly over said valve seat to lead drippings from the wall of said recess over said valve seat to said basket perforate cover when said valve is in open position, said valve, when closed against said valve seat, leading the drippings to said circulating passage between said stem and shaft.

8. The percolator of claim 7, a pointer handle on said valve body above said pot cover, and cooperating indicia on said pot cover.

References Cited in the file of this patent

UNITED STATES PATENTS 690,310    McBride _____ Dec. 31, 1901

FOREIGN PATENTS 395,562    Great Britain _____ July 20, 1933